United States Patent

[11] 3,527,130

| [72] | Inventor | Hugo Knehans<br>Chicago, Illinois |
|---|---|---|
| [21] | Appl. No. | 744,158 |
| [22] | Filed | July 11, 1968 |
| [45] | Patented | Sept. 8, 1970 |
| [73] | Assignee | Argus Manufacturing Company<br>Chicago, Illinois<br>a corporation of Illinois |

[54] PUNCH PRESS TURRET ASSEMBLY
20 Claims, 2 Drawing Figs.

[52] U.S. Cl. .................................................. 83/454,
83/551, 83/552, 83/588, 83/522
[51] Int. Cl. .............................................. B26d 7/02,
B26d 5/08
[50] Field of Search.................................... 83/552,
549, 550, 551, 456, 454, 559, 588, 382, 133, 140,
522; 72/317

[56] References Cited
UNITED STATES PATENTS

| 1,544,393 | /1925 | Hatcher et al. ................ | 83/552X |
| 2,309,998 | /1943 | Tucker ......................... | 83/552X |
| 3,160,046 | /1964 | Bredow ........................ | 83/552X |

*Primary Examiner*—Andrew R. Juhasz
*Assistant Examiner*—James F. Coan
*Attorney*—Hill, Sherman, Meroni, Gross and Simpson ABSTRACT: A drop-in turret assembly is held in a tool holder beneath the ram of a punch press and has a plurality of tool-receiving stations which are indexed between different angular positions. The device includes a die turret having dies which coact with the punches of the tool turret, and includes retractable pins which interconnect the two turrets for rotation together during indexing.

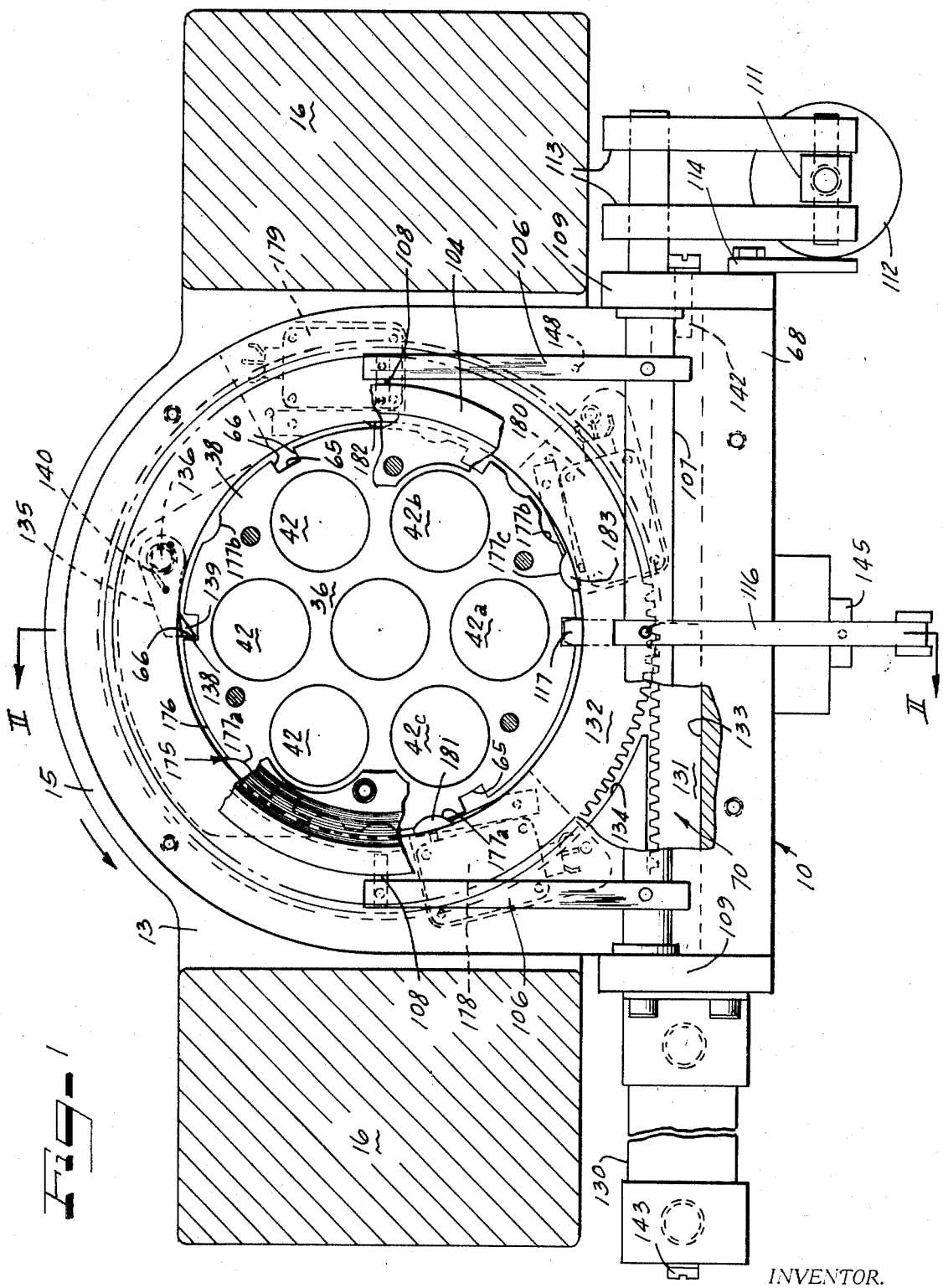

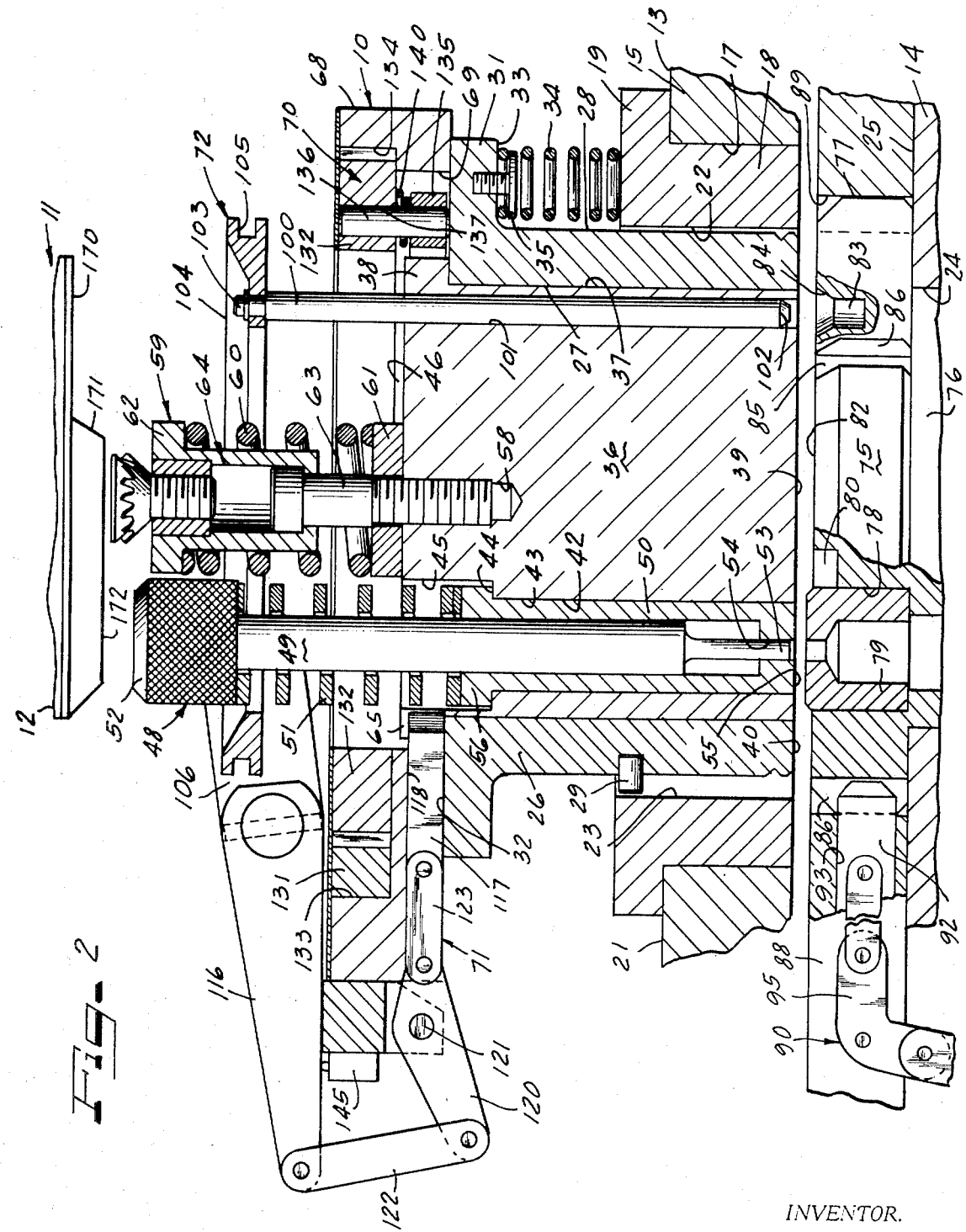

PUNCH PRESS TURRET ASSEMBLY

This invention pertains to a tool holder and in particular to a drop-in turret assembly disposed in an opening of a tool holder beneath a ram of a punch press.

Prior punch presses have a tool holder which supports or receives a single tool or a unitized cluster arrangement of tools which is oriented in a fixed angular position with respect to a reference. Other presses utilize a pair of turret-type tool holders which have a plurality of tool-receiving stations which respectively receive or support individual tools.

A device according to the present invention includes a drop-in turret assembly having a body portion which is slidably supported and rotatably supports a miniature tool turret having a plurality of tool-receiving stations, a rotatable die turret which is selectively interconnected with the tool turret so that both turrets are indexed together, locking means to hold each of the turrets in the preselected position, and indicating means to determine the angular position of the turrets.

Accordingly, it is an object of the present invention to provide a drop-in turret assembly for a tool-holder of a punch press.

Another object of the present invention is to provide a drop-in tool assembly in which a punch receiving turret and a die receiving turret are selectively connected for being indexed together.

Yet another object of the present invention is a drop-in turret assembly for use in a tool holder of a punch press enabling changes in the orientation of the tool with respect to the workpiece.

A still further object of the present invention is such a turret assembly which indicates the tool-receiving station disposed beneath the ram of the press.

Yet another object of the present invention is to provide a drop-in turret assembly which is selectably retained in preselected angular positions.

A further object of this invention is the provision of a drop-in turret assembly by which a single-station press can be converted to a multi-station punch press.

Another object of this invention is the provision of a drop-in turret assembly adapted to be connected to and driven by automatic controls, thereby enabling a conventional single-station punch press which is numerically controlled to be used as an automatically controlled turret press.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example:

FIG. 1 is a plan view with portions broken away for purposes of illustration of the turret assembly disposed in a tool holder of a press; and FIG. 2 is a cross-sectional view taken along the lines II—II of FIG. 1.

The principles of the present invention are particularly useful when embodied in a drop-in turret assembly, illustrated in FIG. 2, generally indicated by the numeral ten and used with a punch press generally indicated at 11.

The punch press 11 is conventional and includes a ram 12, a tool holder 13 and a die bed 14. The tool holder 13 illustrated in FIG. 1, is a U-shaped swing arm tool holder of a known type having a bight portion 15 extending between a pair of upwardly extending arms 16, 16 which attach the tool holder 13 to the frame of the punch press 11. The bight portion 15, as illustrated in FIG. 2, has an opening 17 receiving a sleeve 18 having an annular flange 19 which rests on the upper surface 21 of the bight portion 15. The sleeve 18 has a cylindrical inner surface or opening 22 with an angular locating groove 23. The die bed 14 has a cylindrical opening 24 which in other applications receives dies for coacting with the tools mounted in the tool holder 13. The die bed 14 has a planar upper surface 25.

The turret assembly ten comprises a tubular body 26 having an inner cylindrical guide surface 27 and an outer guide surface 28 which is slidably received in the opening 22 of the tool holder 13. The outer guide surface 28 is provided with an angular locating pin 29 which is engaged in the locating groove 23 to prevent relative rotation of the body 26 in the opening 22 of the tool holder. The body 26 is provided at one end with an annular flange 31 which has an upper surface 32 and a lower surface 33 which engages a plurality of lifting springs 34 (only one being illustrated), each of which is attached to the lower surface 33 by a fastening means or screw 35. The lifting springs 34 act between the flange 19 of the sleeve 18 and the flange 31 of the body 26 to yieldably hold the body in the position illustrated in FIG. 2.

A tool turret 36 is disposed in the body 26 with its external guide surface 37 rotatably engaging the inner cylindrical guide surface 27. The turret 36 has a flange 38 which rests on the upper surface 32 of the flange 31 to retain the turret 36 in the body 26. The lower surface 39 of the turret 36 is thereby held in the plane of the lower surface 40 of the body 26. The turret 36 has six tool-receiving stations 42 which are uniformly angularly spaced about the rotational axis of the turret 36. Each of the tool-receiving stations 42 is a cylindrical bore 43 extending through the turret 36 and has an internal shoulder 44 formed by a counterbore 45 which is adjacent to the upper surface 46 of the turret 36. The tool-receiving station 42 is thereby adapted to receive a tool assembly generally indicated at 48.

The tool assembly 48 comprises a punch 49, a stripper guide sleeve 50 and a spring 51. The punch 49 has a head 52 and a cutting edge 53 which is slidably received in an aperture 54 in the stripper surface 55 of the stripper guide sleeve 50. The stripper surface 55 is held in the plane formed by the lower surfaces 39 and 40 by a flange 56 engaging the internal shoulder 44 of the tool-receiving station 42. The spring 51 acts between the flange 56 and the head 52 to retract the cutting edge 53 into the opening 54 of the sleeve 50.

The turret 36 at its center has a threaded bore 58 receiving a spring-loaded force-transmitting assembly generally indicated at 59. The spring-loaded force-transmitting assembly 59 includes a spring 60 acting between a washer 61 (which engages the upper surface 46 of the turret 36) and a flanged sleeve 62. The sleeve 62 is connected to a bolt 63 by a lost-motion connection indicated at 64.

The flange 38 of the turret 36 has six angularly spaced grooves 65, one of which is associated with each tool-receiving station 42, as best illustrated in FIG. 1. Each of the grooves 65 is defined by a pair of locating abutment surfaces 66 whose function is described below.

Disposed on the upper surface 32 of the body 26 is a housing 68 (FIG. 2). The housing 68 is provided with a cavity 69 receiving the flange 38 of the turret 36 and receiving a portion of an indexing means generally indicated at 70. The housing 68 also supports a lock means generally indicated at 71 and a portion of a clutch or interlocking mechanism generally indicated at 72.

The turret assembly ten includes a die holder or turret 75 which has an outer guide surface made up by a lower portion 76 and a larger diameter upper or remaining portion 77. The die turret 75 rests on the upper surface 25 of the die bed 14 with the lower portion 76 slidably and rotatably engaged in the opening 24. The die turret 75 has six die-receiving stations 78 which are aligned with the tool-receiving stations 42 of the tool turret 36 and which receive dies such as 79. Each of the die receiving stations 78 has a pair of angular locating grooves 80 which extend radially from the axis of the station 78 at typically right angles to each other, which enable the die 79 to be positioned in the die receiving station 78 in either of two predetermined angular orientations. The die turret 75 has six upwardly opening holes 83, each of which has a countersunk portion 84. The upper guide surface portion 77 has six angularly spaced grooves 85 respectively associated with the six die receiving stations 78. Each of the grooves 85 is defined by a pair of locating abutment means 86, 86.

Secured to the upper surface 25 of the die bed 14 is a die turret housing 88 which may include an inner surface 89 which slidably receives the upper portion 77 of the die turret 75. The die turret housing 88 supports a stop or lock means 90 which includes a retractable or reciprocable pin 92 which is carried in a passageway 93 of the housing 88 and which is attached to a fluid actuator (analogous to one described below for the lock means 71) by a linkage 95. The retractable pin 92 moves into the grooves 85 to selectively retain the die turret 75 in the desired angular position.

The clutch or turret interlocking mechanism 72 comprises six pins 100 slidably received in passageways 101 in the tool turret 36. Each of the pins 100 has a pointed or frusto-conical end 102 which is engageable in the holes 83 of the die turret 75 to provide a driving connection between the turrets 36 and 75. The other ends 103 of the pins 100 are attached to a pin positioning means or ring 104 which has a peripheral groove 105. To reciprocate the ring 104, each of a pair of ring actuating arms 106, 106 (FIG. 1) is mounted at one end on a shaft 107 and each has a pin 108 slidably engaged in the peripheral groove 105. The shaft 107, which is supported in a pair of bearing blocks 109, 109 mounted on the housing 68, is connected to a rod 111 of an actuating means 112 by a pair of lever arms 113, 113. The actuating means 112 is a standard double acting fluid operated actuator and is mounted by a bracket 114 to the housing 68. The pins 100 of the clutch 72 are illustrated in a retracted or second position and will move to a first position of engagement in the holes 83 of the die turret when the actuator 112 rotates the shaft 107 as illustrated in FIG. 2 in a clockwise direction to reciprocate the ring 104 toward the turret 36. The shaft 107 also supports a lever arm 116 of the lock means 71.

The lock means 71 further includes a retractable or shotpin 117 which is reciprocably carried in a passageway 118 of the housing 68. The shotpin 117 is interconnected with the lever arm 116 by a linkage connection comprising a pivotal link 120 which is pivotally mounted on a pin 121 to the housing 68, a link 122 which extends between the lever arm 116 and the pivotal link 120, and a link 123 which interconnects the shotpin 117 with the pivotal link 120. Clockwise rotation of the shaft 107 causes the shotpin 117 to be withdrawn from the groove 65 while the clutch 72 is being engaged to thereby enable the tool turret 36 and the die turret 75 to be rotated.

As best illustrated in FIG. 1, the turret indexing means 70 comprises an actuator means 130 which is a conventional double acting fluid actuator that is mounted on the housing 68. The rod of the actuator 130 is attached to a rack gear 131 which is in meshing engagement with a ring gear 132 to form a gear drive of the index means 70. The rack gear 131 slides in a passageway 133 formed in the housing 68. The ring gear 132 is disposed in an upper portion 134 of the cavity 69 (FIG. 2) which portion 134 is concentric with the tool turret 36 and is in communication with the passageway 133. To transfer only counterclockwise rotational movement of the ring gear 132 (FIG. 1) to the turret 36, a one-way driving connection includes an engagement means comprising a pawl or dog 135 which is pivotally mounted on a pin 136 which is secured in an opening 137 in the ring gear 132. The pawl or dog 135 at its distal end is provided with an abutment surface 138 and an oppositely facing cam surface 139. To bias the abutment surface 138 into engagement with one of the locating abutments 66, a torsional spring 140 is provided to act between the pawl 135 and the ring gear 132.

The rack gear 131 has an adjustable stop 142 at the end of the passageway 133 opposite to the actuator 130 to limit travel and the actuator 130 is provided with an adjustable stop 143 to limit retraction. The adjustable stops 142 and 143 thereby enable the length of travel of the rack gear 131 to be changed to adjust the number of degrees of rotation of the ring gear 132 during each stroke of the rod of the actuator 130.

Disposed on the housing 68 is a switch 145 which senses whether the arm 116 is in the down position and thereby whether the shotpin 117 is in engagement in the groove 65. A switch 148 (FIG. 1) is disposed on the housing 68 beneath one of the ring actuating arms 106 which senses whether the shaft 107 has rotated to move the pins 100 into engagement in the holes 83 in the die turret 75.

When the turret assembly 10 is used to carry a plurality of individual tool assemblies 48, only one of the tool assemblies 48 is actuated by the ram 12 of the punch press 11. The remaining five tool assemblies 48 are not contacted by the ram 12 until each is indexed to a position of the station 42a adjacent the shotpin 117 as illustrated in FIG. 1. To actuate only the tool assembly 48 disposed in the tool receiving station 42a, which is the working position, a ram plate 170 (FIG. 2) is attached to the ram 12 and has a projecting pad 171 having a force transmitting surface 172 which contacts the spring-loaded force-transmitting assembly 59 and the head 52 of the tool assembly 48.

To determine which one of the six tool-receiving stations 42 is in the working position adjacent the shotpin 117 and beneath the pad 171, the turret assembly 10 is provided with an indicating means generally indicated at 175 (FIG. 1). The locating grooves 65 divide the periphery of the flange 38 into six equal peripheral segments 176. Disposed on each of the peripheral segments 176 are locating means or depressions 177 which are arranged in a preselected pattern. Disposed in the housing 68 are sensing means comprising three switches 178, 179 and 180 which respectively have spring-loaded followers or switch actuators 181, 182 and 183 in contact with the peripheral surface of the turret 36. Each of the switches 178, 179 and 180 is disposed in the housing 68 so that their respective followers 181, 182 and 183 will register the absence or presence of a depression 177 for distinct angular portions of each of the segments 176. In other words, the follower 181 is disposed to indicate the presence or absence of depressions 177a which are adjacent the grooves 65 in the clockwise direction as viewed in FIG. 1. The follower 182 indicates the presence or absence of depressions 177b which are positioned in the segments 176 midway between the grooves 65, 65. The follower 183 indicates the presence or absence of depressions 177c which are disposed adjacent the grooves 65 in a counterclockwise direction. The switches 178, 179 and 180 are electrically connected to provide jointly a binary indication of the angular position of the turret 36. Each of the segments 176 has a different pattern of depressions 177 so that each one of the six angular positions of the turret 36 will have a distinctive binary indication. The use of three sensing means 178, 179 and 180 allows the use of a different binary indication for each position of the turret 36. Thus, an operator can determine which one of the six tool receiving stations 42 is positioned under the pad 171 of the ram 12. For example, in the angular position illustrated, the switches 178 and 180 are actuated while the switch 179 is not actuated since the follower 182 is determining the absence of a depression 177b in the particular segment 176 on which it contracts; however, if the turret 36 were rotated clockwise one station so that the tool receiving station 42b were under the pad 171, the followers 182 and 183 would each be engaged in their respective depressions 177b and 177c so that the switches 179 and 180 would be actuated.

In operation, as best illustrated in FIG. 2, the punch ram 12 on its downward stroke transfers the punching force through the pad 171 to the spring loaded force-transfer assembly 59 to move the turret 36 and the body 26 against the force of the springs 34 to contact the workpiece placed on the upper surface 82 of the die turret 75. During such movement, the downward force is applied centrally to the turret 36, thereby avoiding cocking or binding within the opening 22. When the lower surfaces 39 and 40 of the turret 36 and body 26 have contacted the workpiece, their downward movement is arrested and the spring 60 of the assembly 59 begins to yield so that the pad 171 on the ram 12 contacts the head 52 of the tool assembly 48 to force the cutting edge 53 through workpiece. The spring 60 also insures that the workpiece is clamped between the surfaces 39, 40 and the upper surface 82 of the die turret 75. The spring-loaded assembly 59 is adjusted in height so that the pad 171 contacts it first to insure that the vertical movement of the turret is complete before any force is applied to the head 52. Upon completion of the downward stroke and the start of the upward stroke of the ram 12, the spring 60 causes the turret 36 to remain in tight engagement with the workpiece while the spring 51 causes the stripping of the cutting edge 53 from the workpiece. Near the end of the upward stroke of the ram 12, as the lost-motion connection 64 limits the expansion of the spring 60, the lifting springs 34 lift the body 26 and hence the turret 36 upwardly to the position illustrated.

To index the punch turret 36 and the die turret 75 to another station, the actuators 112 controlling the retractable pins 92 and 117 are operated to retract the pin 92 from the groove 85, to cause the shaft 107 to retract the shotpin 117, and to cause the pins 100 to slide into the first or engaged position in the holes 83 of the turret die 75. Completion of these functions is sensed by the switch 148 to indicate the readiness for or the control of operation of the indexing actuator 130. The rack gear 131 is then moved toward the right by the actuator 130 (FIG. 1) to cause the ring gear 132 to rotate counterclockwise 60° to rotate the two turrets until the tool receiving station 42c moves to the working position beneath the pad 171. On the return stroke of the rack gear 131, the turrets 36 and 75 remain stationary by friction and the ring gear 132 is rotated back to the position illustrated and the cam surface 139 on the pawl 135 causes the disengagement between the turret 36 and the ring gear 132. If the binary indicating means is then sensing an undesired combination of depressions, the actuator 130 is recycled. If the binary indicating means is then sensing the desired combination of depressions, the actuators 112 are activated to rotate the shaft 107 counterclockwise to raise the ring 104 to withdraw the pins 100 from the die turret 75 and to insert the pins 92 and 117 in the grooves 85 and 65 respectively. The completion of the retraction of the pins 100 and the engagement of the pin 117 is sensed by the switch or sensing means 145 as it is engaged by the arm 116.

When this invention is utilized in a manually controlled punch press, the flow of pressurized fluid to and from the various fluid actuators is manually controlled, and the switches are connected to suitable indicating means such as lights in the view of the operator. Preferably, the binary switches 178—180 are connected to a numerical control device which also controls the actuators, and the switches such as 145, 148 are used as part of the control circuit, the details of which do not otherwise form a part of this invention, and which can be of conventional type.

I claim:

1. A turret assembly disposable in an opening of a tool holder beneath the ram of a punch press, comprising:
   a. a generally tubular body having an inner cylindrical guide surface, and an outer guide surface, said body being receivable in the tool holder opening of the press with said outer guide surface in slidable engagement with the tool holder;
   b. a tool turret having a plurality of tool-receiving stations and an external guide surface, said turret being rotatably disposed in said body with said external guide surface engaging said inner cylindrical guide surface; and
   c. indexing means disposed on said body for rotating said turret in said body so that a selected tool-receiving station is positioned beneath the ram of the press.

2. A turret assembly according to claim 1, including lock means disposed on said body for selectively engaging said tool turret to prevent rotation between said tool turret and said tubular body.

3. A turret assembly according to claim 2, wherein said turret has a plurality of pairs of locating abutments respectively associated with said tool receiving stations, and wherein said lock means includes a reciprocable pin slidably guided by said body, and being engageable with a preselected one of said pairs of locating abutments.

4. A turret assembly according to claim 2, wherein said lock means include:

a. a reciprocable shotpin slidably guided on said body and engageable with said turret; and
   b. powered actuator means supported by said body and connected to said shotpin to move said shotpin into and out of engagement with said turret.

5. A turret assembly according to claim 4, wherein said lock means includes a linkage connection interconnecting said pin and said actuator means.

6. A turret assembly according to claim 1, wherein said assembly further includes a die turret having a plurality of die-receiving stations coactable with said tool-receiving stations, said die turret having an outer guide surface, rotatably receivable in an opening on the bed of the punch press.

7. A turret assembly according to claim 6 including:
   a. a housing arranged to be supported on the bed of the punch press adjacent to said die turret; and
   b. lock means disposed on said housing for selectively engaging and retaining said die turret in a preselected angular position.

8. A turret assembly according to claim 7, wherein said die turret has a plurality of pairs of locating abutment means respectively associated with said die receiving stations; and wherein said lock means includes a reciprocable pin slidably guided by said housing and engageable with a preselected one of said pairs of locating abutment means.

9. A turret assembly according to claim 6, including an interlocking mechanism carried by one of said turrets and selectably engageable with the other of said turrets for corotatably connecting said turrets together.

10. A turret assembly according to claim 9, wherein said interlocking mechanism comprises:
    a. a pin means slidably disposed in said tool turret and arranged to be reciprocated into a driving connection with said die turret; and
    b. pin positioning means for moving said pin means between a first position of engagement with said die turret and a second position in which said pin means is retracted from said die turret, whereby said indexing means will rotate both of said turrets when said pin means is in said first position.

11. A turret assembly according to claim 10, wherein said pin positioning means comprises:
    a. a ring attached to the upper end of said pin means;
    b. a ring actuating arm pivotally disposed on said body and supporting said ring in a manner enabling rotation of said ring with respect to said arm; and
    c. actuator means connected to said arm for pivoting said arm to move said pin means between said first and second positions.

12. A turret assembly according to claim 1, wherein said indexing means comprises:
    a. a housing mounted on said body;
    b. actuator means disposed on said housing; and
    c. a gear drive mounted on said housing and connected to and driven by said actuator means, and also having a driving connection with said tool turret.

13. A turret assembly according to claim 12, wherein said gear drive comprises:
    a. a rack gear slidably disposed in said housing and being the portion connected to said actuating means;
    b. a ring gear disposed in said housing coaxially with said turret and in meshing engagement with said rack gear; and
    c. engagement means disposed on said ring gear and having said driving connection with said tool turret.

14. A turret assembly according to claim 13, wherein the driving connection of said engagement means comprises a spring-biased pawl pivotably mounted on said ring, and being engageable with successive abutment surfaces on said tool turret to effect a one-way rotation of said tool turret in a step-by-step manner.

15. A turret assembly according to claim 1, which includes binary means carried by said tool turret and said body for indicating the angular position of said tool turret in said body.

16. A turret assembly according to claim 15, wherein said binary means comprises:
   a. locating means disposed on said tool turret in a series of patterns, each pattern being distinctive of one of said tool-receiving stations; and
   b. sensing means disposed on said body and responsive to the presence and absence of the locating means.

17. A turret assembly according to claim 16, wherein said patterns include those with a predetermined number of and arrangement of depressions on said turret, and wherein said sensing means includes a plurality of switches each having a follower biased against said tool turret and receivable in said depressions, a different combination of said switch followers being received in said depressions for each of the patterns associated with said tool-receiving stations to actuate the corresponding switches.

18. A turret assembly according to claim 4, including switch means responsive to movement of said actuator for indicating the presence of said shotpin in each of its extreme positions of travel.

19. A turret assembly according to claim 4, including:
   a. a die turret having a plurality of die-receiving stations coactable with said tool receiving stations, and arranged to be rotatably supported on the bed of the punch press; and
   b. an interlocking mechanism carried by said tool turret and selectably engageable with said die turret for corotatably connecting said turrets together, said interlocking mechanism being connected to and driven by said powered actuator means to connect said turrets together concurrently with the movement of said shotpin out of engagement with said tool turret.

20. A turret assembly according to claim 1, wherein said tool turret is vertically movable with respect to the tool holder, and including:
   a. lifting springs yieldably biasing said turret to an upper position; and
   b. resiliently yieldable force transfer means disposed centrally at the upper surface of said tool turret and projecting toward the ram beyond any tools in said tool-receiving stations, to be engaged by the ram, said yieldable means resisting deflection with sufficient force so as to enable said lifting springs to yield and said tool turret to engage a workpiece before the ram can engage any of the tools.